United States Patent [19]

Howard

[11] Patent Number: 5,145,199
[45] Date of Patent: Sep. 8, 1992

[54] CLEAR BED GOOSENECK TRAILER HITCH

[76] Inventor: James P. Howard, 822 Cari Ann Dr., Jefferson City, Mo. 65109

[21] Appl. No.: 661,405

[22] Filed: Feb. 26, 1991

[51] Int. Cl.$^5$ .......................... B60D 1/06; B60D 1/52; B62D 53/06
[52] U.S. Cl. .................... 280/495; 280/901; 280/511; 280/491.5; 280/433
[58] Field of Search .............. 280/901, 433, 418.1, 280/423.1, 415.1, 416.1, 491.1, 511, 417.1, 495, 491.5

[56] References Cited

U.S. PATENT DOCUMENTS

| | | | |
|---|---|---|---|
| 3,650,546 | 3/1972 | Koening | 280/423.1 |
| 3,703,301 | 11/1972 | Randle | 280/901 X |
| 3,889,978 | 6/1975 | Kann | 280/415.1 |
| 4,176,853 | 12/1979 | Brock | 280/901 X |
| 4,183,548 | 1/1980 | Schneckloth | 280/901 X |
| 4,546,994 | 10/1985 | Taylor | 280/901 X |
| 4,643,443 | 2/1987 | Husa | 280/491.5 |
| 4,823,905 | 4/1989 | Piëlh | 180/274 |
| 4,883,285 | 11/1989 | Hohrman | 280/491.5 |
| 4,884,652 | 12/1989 | Vollmer | 280/777 |
| 4,921,266 | 5/1990 | Beals | 280/415.1 |

FOREIGN PATENT DOCUMENTS

| | | | |
|---|---|---|---|
| 8501707 | 4/1985 | World Int. Prop. O. | 180/274 |
| 8501709 | 4/1985 | World Int. Prop. O. | 180/274 |
| 8901430 | 2/1989 | World Int. Prop. O. | 280/806 |

*Primary Examiner*—Charles A. Marmor
*Assistant Examiner*—Kevin Hurley
*Attorney, Agent, or Firm*—Robbins & Robbins

[57] ABSTRACT

A clear bed gooseneck trailer hitch is provided. The trailer hitch is comprised of a wide metal plate, or disc, supported on a truck bed and having a standard long shank hitch ball fixedly connected perpendicularly therethrough. The threaded shaft of the shank hitch ball attaches to a threaded hole provided in a steel plate or channel of suitable design affixed underneath the truck bed to the frame rails of a pickup truck over the rear axle area. The plate has two handles on its top side located near the edge of the disc for use in turning the disc manually or by a torque bar upon attachment to or removal from the truck bed. Once the disc is removed, the truck bed remains clear and unobstructed for use in other conventional manners. The disc is used with a rubber bed mat, or a rubber washer, having a circumference slightly larger than the disc. The disc is designed with a slight camber or concavity so that its circumference initially contacts the rubber mat upon tightening and causes a compressive friction that securely holds the disc in place and prevents rotation.

9 Claims, 2 Drawing Sheets

CLEAR BED GOOSENECK TRAILER HITCH

BACKGROUND OF THE INVENTION

The present invention relates to trailer hitches for trailers popularized as the gooseneck type. It has long been a problem to provide a trailer hitch that is adaptable to gooseneck trailers, yet does not interfere with the normal use of the pickup truck bed when the trailer is not in use. The trailer hitch for a gooseneck type trailer is typically installed in the middle of the truck bed, thus interfering with the load hauling capabilities of the truck.

The traditional gooseneck trailer hitch designs all have their respective disadvantages. One standard design employs a long neck hitch ball placed through the bed of the truck and secured to a sub-bed hitch plate. This type generally requires up to a three inch hole to be made in the bed of the truck for receiving the hitch ball and requires tools, such as wrenches, for installation and removal. This type of hitch does not compensate for lateral forces on it generated by a shifting trailer.

Another hitch design provides a large metal plate supported on the bed and bolted through to the truck frame with the hitch ball welded on to the plate. The plate, although very stable, is awkward to install and difficult to remove. This arrangement accommodates lateral forces adequately, but because of its structure, it obstructs the truck bed for loading and other purposes.

A third type of hitch design recognizes the need for an unencumbered truck bed when the hitch is not in use, and provides a ball hitch that folds down into a recess for storage. This type is extremely difficult to install, requiring removal of the truck bed.

Accordingly, there exists a need for a gooseneck trailer hitch which is easy to install, provides a stable point of attachment of the trailer to the towing truck, and is easily removable whereby the bed of the towing truck can be cleared for conventional loading and other purposes.

SUMMARY OF THE INVENTION

By means of the instant invention there has been provided a gooseneck trailer hitch having the qualities of easy installation and stability which may be easily removed to provide a clear truck bed when the truck is not hauling a trailer.

The trailer hitch is comprised of a round metal plate, or disc which fixedly receives, by welding or otherwise, a standard long shank hitch ball perpendicularly therethrough so that an integral unit is formed. The disc has two handles on its top side, each located near the edge of the disc and diametrically opposing one another. The threaded end of the ball hitch shank is attached to a threaded hole provided in a steel plate or channel of suitable design which is welded or otherwise attached under the truck bed to the frame rails of the pickup truck over the rear axle area.

The disc is attached and tightened by inserting the shank through a 1½ inch hole cut into the truck bed and into the provided threaded hole of the sub-frame and rotating the disc in a conventional tightening manner using the handles provided on the disc. The disc is used with a bed mat or washer made of rubber, or other resilient material, slightly larger than the circumference of the disc. The disc is designed with a slight camber or concavity so that its circumference contacts the rubber mat first and causes a compressive friction, as in a lock washer, that securely holds the disc in place and prevents rotation. Removal of the disc is effected by simply rotating the disc in a loosening manner until the shank of the ball hitch is free from the sub-frame. Thus the truck bed is clear of obstructions and may be used for loading and other purposes.

It is therefore an object of this invention to provide a gooseneck trailer hitch that is easy to install and remove without the need of special tools, thus providing a clear truck bed when not in use.

It is further an object of this invention to provide a trailer hitch which provides a stable point of attachment for the trailer to the towing truck.

It is still further an object of this invention to provide a trailer hitch that is inexpensive to manufacture, and that is attractive, compact and portable.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
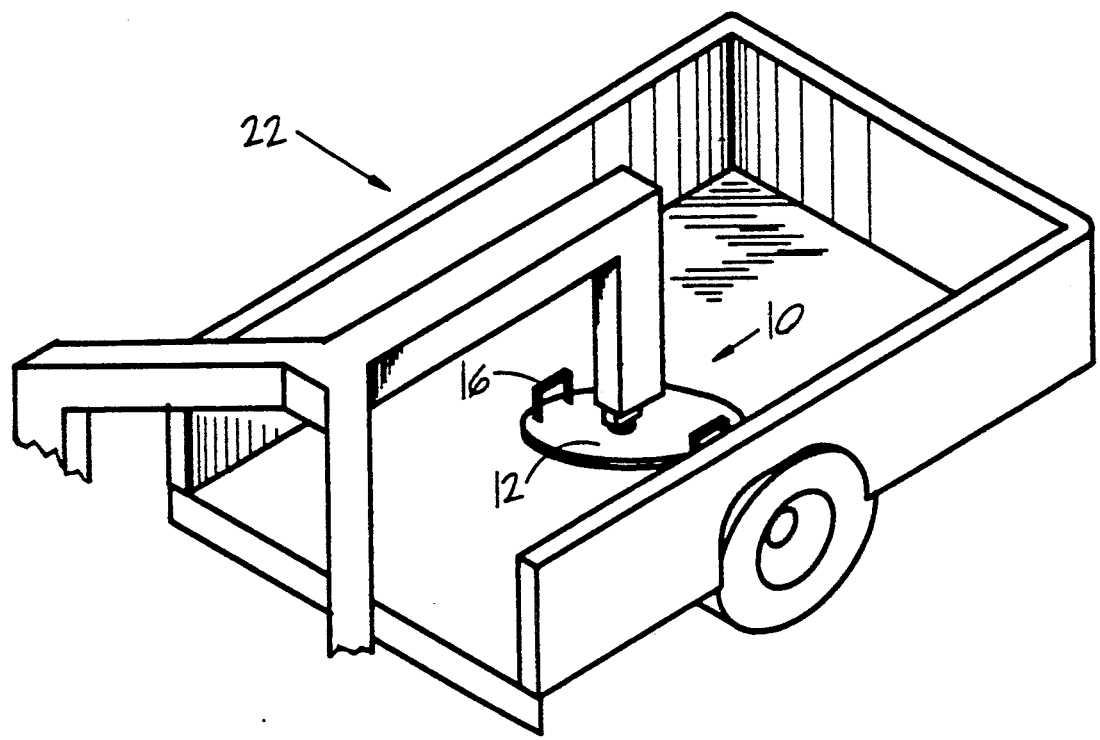
FIG. 1 is a perspective view of the trailer hitch as installed in the bed of a pickup truck with a gooseneck trailer, partially shown, attached to it.
Figure 2:
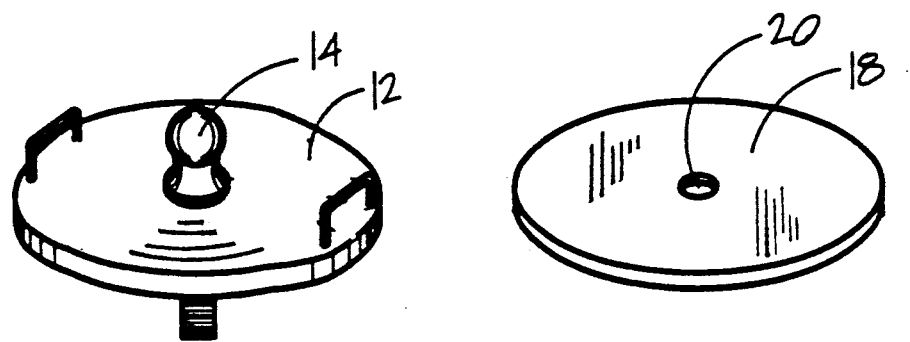
FIG. 2 is a perspective view of the trailer hitch disc and resilient mat of the invention placed side by side.

The gooseneck trailer hitch of the instant invention, generally indicated by the reference numeral 10, is comprised of a circular plate, or disc 12, preferably made of tread plate steel or other metal for strength. Integrally attached therethrough by welding or the like is a long shank ball hitch 14 with the ball end projecting from the top side and the threaded shank end 15 projecting from the bottom side.

Figure 3:
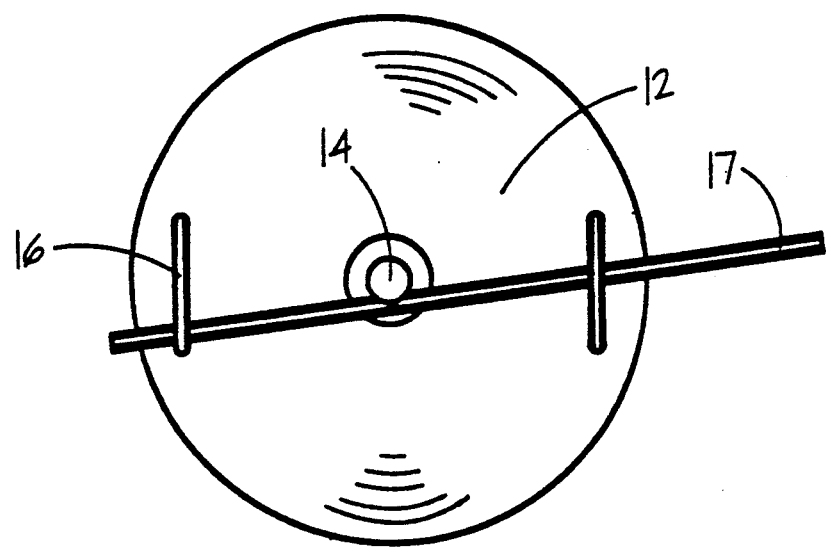
FIG. 3 is a top plan view of the trailer hitch disc, showing a torque bar that may be employed in tightening or loosening the disc.

Disc 12 is optimally 18 inches in diameter and is 3/16 inch thick. The disc is formed with a slight camber of approximately ⅛ inch. Disc 12 has C-shaped handles 16 connected to its top side which are located towards the edge of the disc and oppose each other. The handles can receive a torque bar 17, or rod, which may be used in tightening or loosening the disc, the latter being shown in FIG. 3.

Gooseneck trailer hitch 10 also comprises a circular mat 18 composed of a resilient material, such as rubber or the like. Mat 18 is of slightly larger diameter than disc 12 and may be approximately ¼ inch thick. Mat 18 has a hole 20 which has a diameter of a sufficient dimension to receive the shank of ball hitch 14. This circular mat is needed in the event a bed mat of suitable type is not already in place.

Figure 4:
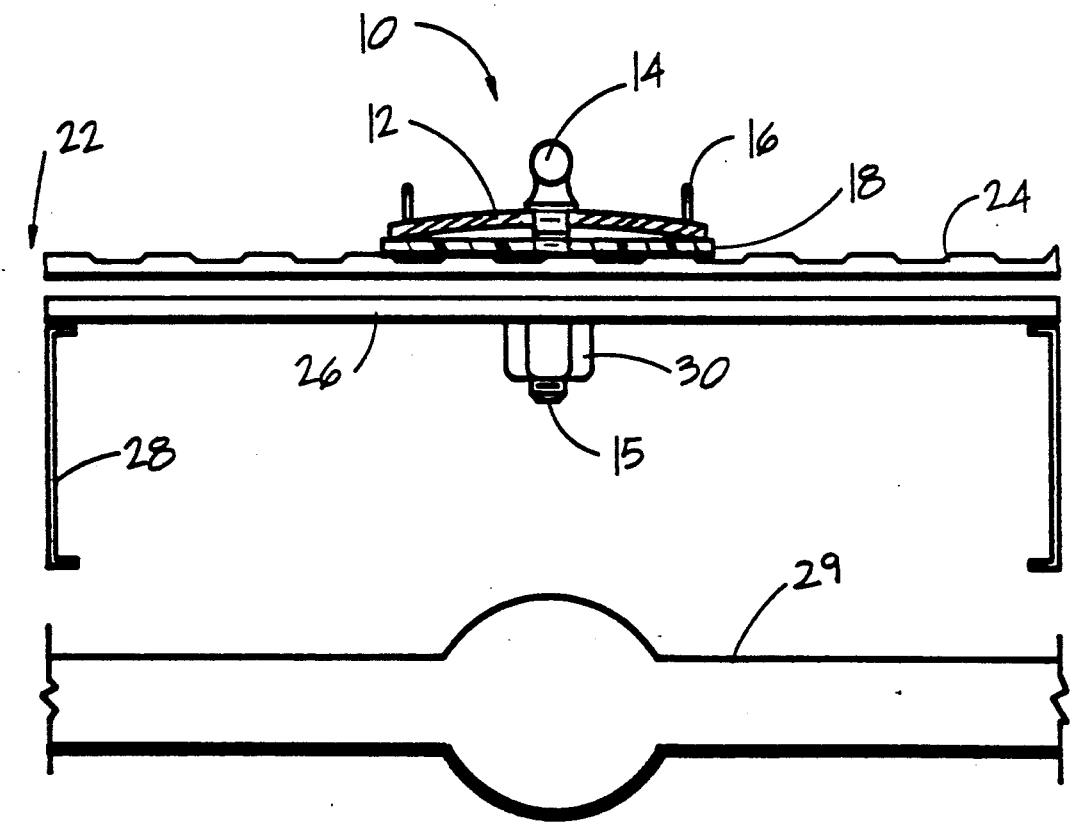
FIG. 4 is a fragmentary view in elevation partly in section from the rear of a truck with the trailer hitch disc of the invention attached.

The gooseneck trailer hitch of the instant invention can be employed in the bed of any pickup truck, where the truck bed is first modified to receive the hitch. Referring to FIGS. 1 and 4, the truck is generally indicated by the reference numeral 22. A hole of sufficient diameter to receive the shank 15 is drilled in bed 24. A metal plate or channel 26 is welded or otherwise attached to the truck frame 28 underneath bed 24 and over axle 29, and has a corresponding hole in alignment with the hole in bed 24. A threaded fixation nut 30 is welded underneath plate 26 and is also in alignment with the holes of bed 24 and plate 26.

USE

After a truck bed has been so modified, the gooseneck trailer hitch of the instant invention is very simply installed. The user connecting the hitch should first position mat 18 on the underneath side of disc 12 so that hole 20 of the mat receives shank 15. The user then grabs handles 16 and manipulates disc 12 so that threaded shank 15 passes through the holes in bed 24 and plate 26 and engages threaded fixation nut 30. Tightening is effected by rotating the disc, using handles 16, in a normal tightening manner. As the disc is tightened, the convex camber and an inner concavity of disc 12, as seen in FIG. 4, flattens against mat 18 causing a compressive friction that securely holds the hitch in place and prevents spontaneous loosening. The handles are constructed so that a torque bar 17 may be easily inserted therebetween, spanning disc 12, to allow for extra force and tightening leverage against the ball hitch, if needed. Removal is effected by reversing the aforementioned operation. The torque bar fitting through the handles is particularly useful in freeing a "jammed" fit. Use of the torque bar is also effective using only one handle as a fulcrum point, with one end of the bar engaging the ball hitch, to generate torque force to the disc.

The gooseneck trailer hitch of the instant invention is a significant improvement over the art in that it is inexpensive to manufacture, is compact and portable, and easily installed in the bed of a pickup truck to provide a stable point of attachment without the need for any tools. It is easily removed when not in use, and allows the bed of the truck to be free of obstruction for use in other conventional manners.

Various changes and modifications may be made within this invention as will be apparent to those skilled in the art. Such changes and modifications are within the scope and teaching of this invention as defined in the claims appended hereto.

What is claimed is:

1. A trailer hitch for mounting on the bed of a truck, said hitch comprising a metal disc, said disc fixedly receiving a ball hitch and shank perpendicularly therethrough, said shank being threaded at a free end thereof for attachment to a threaded receptacle provided in a frame member underneath said truck bed whereby said hitch may be mounted to said bed, said disc having handle means whereby said hitch may be tightened to said bed by manipulation of said disc, said metal disc extending radially substantially beyond said shank and said threaded receptacle to bear against said bed to provide stability and force distribution against stress encountered in towing.

2. The trailer hitch of claim 1 in which said handle means are comprised of at least one handle fixed to a top surface of said disc, said handle being placed at an outer edge of said disc.

3. The trailer hitch of claim 2 in which said handle extends upwardly a sufficient distance above said top surface of said disc to function as a point against which a bar having an end engaging said ball hitch is applied to impart a torque to said disc as an aid in tightening and loosening said hitch.

4. The trailer hitch of claim 3 in which said handle means are comprised of two handles fixed to a top surface of said disc, said handles each being placed at an outer edge of said disc, and being diametrically opposed to one another.

5. The trailer hitch of claim 4 in which said handles each have an internal opening sufficient to allow for passage therethrough of a bar, whereby said bar may be used to impart a torque to said disc as an aid in tightening and loosening said hitch.

6. The trailer hitch of claim 1 in which a bottom surface of said disc has a slight camber whereby the outer edge of said disc contacts said bed before a central portion of said bottom surface of said disc, whereby a compressive friction may be generated so that said disc is held firmly in place and resists rotation.

7. The trailer hitch of claim 1 in which a rubber mat having a diameter at least as great as said disc is placed between said disc and said bed, whereby said disc may be drawn tight against said mat to generate a compressive friction so that said disc is held firmly in place and resists rotation.

8. The trailer hitch of claim 1 in which a bottom surface of said disc has a slight camber whereby the outer edge of said disc contacts said bed before a central portion of said bottom surface of said disc, and a rubber mat is placed between said disc and said bed, whereby said disc may be drawn tight against said mat to generate a compressive friction so that said disc is held firmly in place and resists rotation.

9. A trailer hitch for mounting on the bed of a truck, said hitch comprising a metal disc, said disc fixedly receiving a ball hitch and shank perpendicularly therethrough, said shank being threaded at a free end thereof for attachment to a threaded receptacle provided in a frame member underneath said truck bed whereby said hitch may be mounted to said bed, said disc having handle means whereby said hitch may be tightened to said bed by manipulation of said disc, said metal disc extending radially substantially beyond said shank and said threaded receptacle to bear against said bed to provide stability and force distribution against stress encountered in towing, a bottom surface of said disc having a slight camber whereby the outer edge of said disc contacts said bed before a central portion of said bottom surface of said disc, whereby a compressive friction may be generated so that said disc is held firmly in place and resists rotation.

* * * * *